United States Patent
Sawabe et al.

(10) Patent No.: US 7,978,408 B2
(45) Date of Patent: Jul. 12, 2011

(54) POLARIZING DEVICE AND LASER UNIT

(75) Inventors: Taiki Sawabe, Ota-ku (JP); Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 12/616,417

(22) Filed: Nov. 11, 2009

(65) Prior Publication Data

US 2010/0142049 A1      Jun. 10, 2010

(30) Foreign Application Priority Data

Dec. 8, 2008  (JP) .................................. 2008-311984

(51) Int. Cl.
*G02B 5/30* (2006.01)
*G02B 27/28* (2006.01)

(52) U.S. Cl. .......... 359/485.01; 359/485.06; 359/489.07

(58) Field of Classification Search .................. 359/485, 359/487, 494, 485.01, 485.06, 489.07
See application file for complete search history.

(56) References Cited

U.S. PATENT DOCUMENTS

| | | | | |
|---|---|---|---|---|
| 3,547,526 A | * | 12/1970 | Devereux | 359/729 |
| 3,972,619 A | * | 8/1976 | Stevens | 356/369 |
| 4,547,651 A | * | 10/1985 | Maruyama | 219/121.67 |
| 4,755,027 A | * | 7/1988 | Schafer | 359/487 |
| 4,943,126 A | * | 7/1990 | Lang et al. | 359/12 |
| 5,148,010 A | * | 9/1992 | Mori | 250/201.5 |
| 5,359,622 A | * | 10/1994 | Shih | 372/108 |
| 5,375,130 A | * | 12/1994 | Shih | 372/2 |
| 5,382,999 A | * | 1/1995 | Kamon | 355/53 |
| 5,436,761 A | * | 7/1995 | Kamon | 359/487 |
| 5,675,401 A | * | 10/1997 | Wangler et al. | 355/67 |
| 6,259,512 B1 | * | 7/2001 | Mizouchi | 355/67 |
| 6,392,800 B2 | * | 5/2002 | Schuster | 359/485 |
| 6,452,662 B2 | * | 9/2002 | Mulkens et al. | 355/67 |
| 2001/0046038 A1 | * | 11/2001 | Mulkens et al. | 355/67 |
| 2006/0146384 A1 | * | 7/2006 | Schultz et al. | 359/9 |
| 2010/0231887 A1 | * | 9/2010 | Fiolka et al. | 355/71 |

FOREIGN PATENT DOCUMENTS

| JP | A 10-305420 | 11/1998 |
|---|---|---|
| JP | B2 3408805 | 7/2002 |

* cited by examiner

*Primary Examiner* — Ricky D Shafer

(74) *Attorney, Agent, or Firm* — Greer, Burns & Crain, Ltd.

(57) ABSTRACT

A polarizing device for converting a circularly polarized light beam into a radial polarized light beam, wherein the circularly polarized light beam is obtained by passing a linearly polarized light beam oscillated from a laser oscillator through a quarter-wave plate. The polarizing device includes an axicon lens having a conical surface and a dielectric film formed on the conical surface of the axicon lens.

6 Claims, 4 Drawing Sheets

POLARIZING DEVICE AND LASER UNIT

BACKGROUND OF THE INVENTION

1. Field of the Invention

The present invention relates to a polarizing device for converting a circularly polarized light beam into a radial polarized light beam, wherein the circularly polarized light beam is obtained by passing a linearly polarized light beam oscillated from a laser oscillator through a quarter-wave plate, and also relates to a laser unit using this polarizing device.

2. Description of the Related Art

In a semiconductor device fabrication process, the front side of a substantially disk-shaped semiconductor wafer is formed with a plurality of crossing division lines called streets to thereby define a plurality of partitioned regions arranged like a matrix, and a plurality of devices such as ICs and LSIs are formed in these partitioned regions. The semiconductor wafer is cut along these streets to divide the partitioned regions, thus fabricating the individual devices. Further, an optical device wafer is fabricated by forming a plurality of crossing streets on the front side of a sapphire substrate or the like to thereby define a plurality of partitioned regions and layering a gallium nitride compound semiconductor or the like in each of these partitioned regions to thereby form an optical device. Such an optical device wafer is cut along the streets into a plurality of optical devices such as light emitting diodes (LEDs) and laser diodes (LDs), which are widely used for electrical equipment. A technique for dividing a wafer such as a semiconductor wafer and an optical device wafer along the streets by applying a laser beam along the streets is disclosed in Japanese Patent Laid-open No. Hei 10-305420 and Japanese Patent No. 3408805.

Such a wafer is formed of silicon, sapphire, or silicon carbide, for example, and a laser beam having a wavelength fit for the wafer material and wafer processing conditions is suitably selected. The laser beam is converted into various polarized light beams such as a linearly polarized light beam, circularly polarized light beam, radial polarized light beam, and azimuthal polarized light beam, and any one of these polarized light beams is suitably selected according to wafer processing conditions. A laser beam oscillated from a normal laser oscillator is a substantially uniform linearly polarized light beam. The linearly polarized light beam oscillated from the laser oscillator is converted into a circularly polarized light beam by a quarter-wave plate, so as to improve the processability by the laser beam. The circularly polarized light beam is converted into a radial polarized light beam superior in focusing characteristics by a polarizing device.

SUMMARY OF THE INVENTION

Such a polarizing device for converting a circularly polarized light beam into a radial polarized light beam is configured so that a dielectric film is formed in the regions of a transparent plate divided at equal angles about the center of the transparent plate, wherein the dielectric film has a transmission property to the P-polarized light component of the laser beam and a reflection property to the S-polarized light component of the laser beam. For example, in the case that the dielectric film is formed in the regions of a transparent plate equally divided at 30 degrees, the circularly polarized light beam is converted into a radial polarized light beam having a dodecagonal cross section. That is, a radial polarized light beam having a circular cross section cannot be obtained. A radial polarized light beam having a cross section approximated to a circular cross section may be obtained by polygonally dividing the regions of the transparent plate where the dielectric film is formed. However, the polarizing device becomes complicated in configuration and very costly.

It is therefore an object of the present invention to provide a polarizing device which can convert a circularly polarized light beam into a radial polarized light beam having a circular cross section.

It is another object of the present invention to provide a laser unit using this polarizing device.

In accordance with an aspect of the present invention, there is provided a polarizing device for converting a circularly polarized light beam into a radial polarized light beam, including an axicon lens having a conical surface and a bottom surface; and a dielectric film formed on the conical surface of the axicon lens.

Preferably, the conical surface of the axicon lens has a vertex angle of 90 degrees. Preferably, the polarizing device further includes a transparent member provided so as to cover the conical surface of the axicon lens, the transparent member having the same refractive index as that of the axicon lens; the transparent member having an incident surface parallel to the bottom surface of the axicon lens.

In accordance with another aspect of the present invention, there is provided a laser unit including a laser oscillator; a quarter-wave plate for converting a linearly polarized light beam oscillated from the laser oscillator into a circularly polarized light beam; and a polarizing device for converting the circularly polarized light beam obtained by the quarter-wave plate into a radial polarized light beam; the polarizing device including an axicon lens having a conical surface and a dielectric film formed on the conical surface of the axicon lens.

Preferably, the laser unit further includes a half-wave plate provided downstream of the polarizing device in the propagation direction of light, the half-wave plate being rotatable between a first position where the radial polarized light beam obtained by the polarizing device is passed and a second position where the radial polarized light beam is converted into an azimuthal polarized light beam.

The polarizing device according to the present invention is configured by forming the dielectric film on the conical surface of the axicon lens. Accordingly, the radial polarized light beam converted from the circularly polarized light beam by the polarizing device has a circular cross section rather than a polygonal cross section. Further, since the polarizing device is configured by forming the dielectric film on the conical surface of the axicon lens, the configuration of the polarizing device can be made very simple and it can therefore be manufactured at a low cost as compared with the above-mentioned conventional polarizing device having such a configuration that a dielectric film is formed in the regions of a transparent plate divided at equal angles about the center of the transparent plate.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
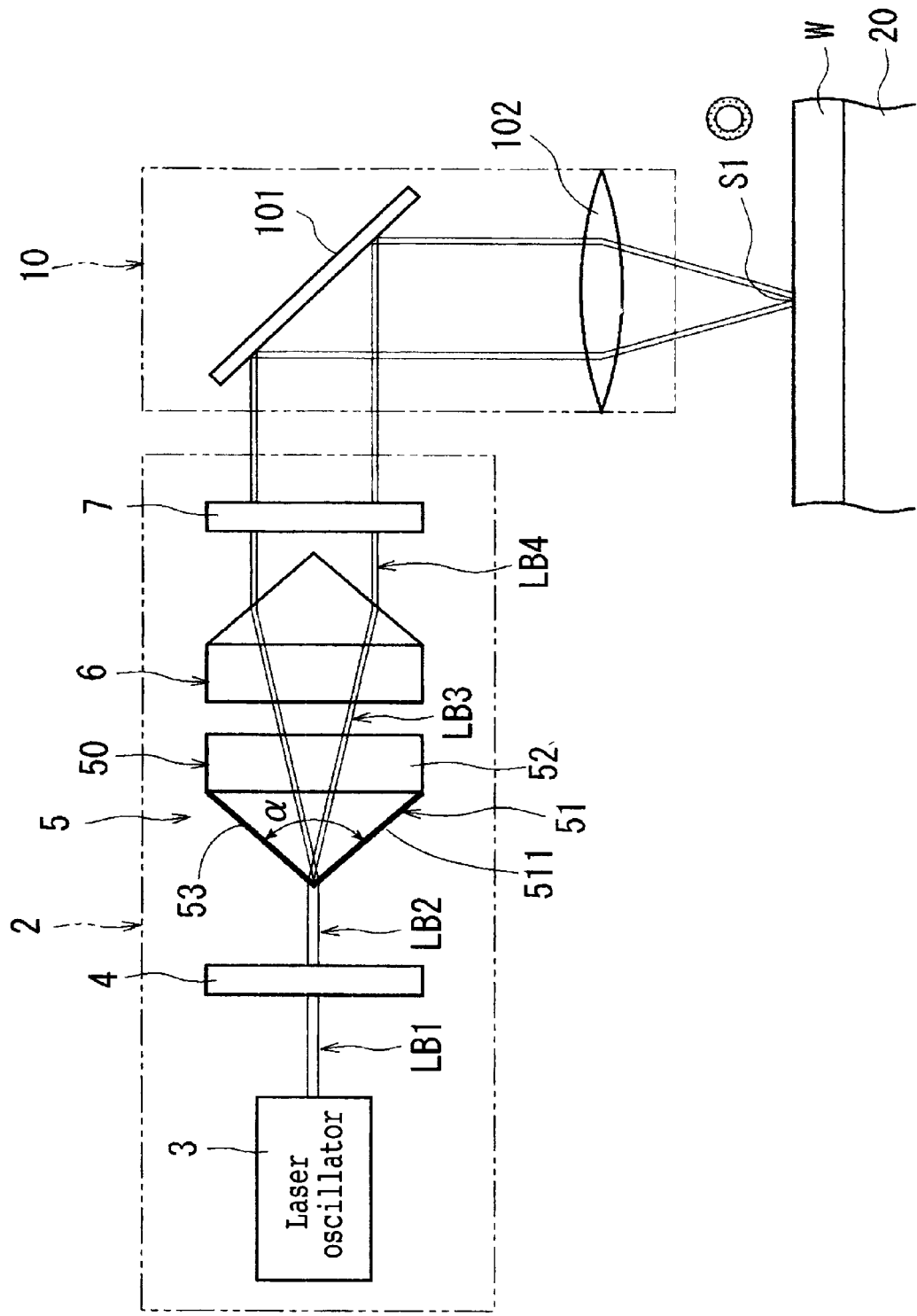
FIG. 1 is a schematic diagram showing the configuration of a laser processing apparatus including a laser unit using a polarizing device according to a first preferred embodiment of the present invention.

Some preferred embodiments of the present invention will now be described in detail with reference to the attached drawings. FIG. 1 shows a laser processing apparatus including a laser unit 2 using a polarizing device 5 according to a first preferred embodiment of the present invention. The laser processing apparatus shown in FIG. 1 is composed of the laser unit 2 and a focusing apparatus 10 for focusing a laser beam applied from the laser unit 2 onto a workpiece W held on a chuck table 20.

The laser unit 2 shown in FIG. 1 includes a laser oscillator 3, a quarter-wave plate 4, the polarizing device 5 according to this preferred embodiment, an axicon lens 6, and a half-wave plate 7 arranged in series in this order in the propagation direction of light. The laser oscillator 3 oscillates a linearly polarized light beam LB1. The quarter-wave plate 4 converts the linearly polarized light beam LB1 oscillated from the laser oscillator 3 into a circularly polarized light beam LB2.

The polarizing device 5 converts the circularly polarized light beam LB2 obtained by the quarter-wave plate 4 into a radial polarized light beam LB3. The polarizing device 5 includes an axicon lens 50. The axicon lens 50 is composed of a conical portion 51 and a cylindrical portion 52. The conical portion 51 has a conical surface 511. A dielectric film 53 is formed on the conical surface 511. The conical surface 511 has a vertex angle ($\alpha$) of 90 degrees. The polarizing device 5 is set so that the center of the circularly polarized light beam LB2 obtained by the quarter-wave plate 4 coincides with the vertex of the conical surface 511. The S-polarized light component of the circularly polarized light beam LB2 applied to the dielectric film 53 formed on the conical surface 511 of the polarizing device 5 is reflected by the dielectric film 53, and the P-polarized light component of the circularly polarized light beam LB2 is transmitted through the dielectric film 53 and converted into the radial polarized light beam LB3. The radial polarized light beam LB3 has an annular cross section because it passed through the dielectric film 53 formed on the conical surface 511 of the axicon lens 50 constituting the polarizing device 5.

Thus, the dielectric film 53 is formed on the conical surface 511 of the axicon lens 50 constituting the polarizing device 5, so that the radial polarized light beam LB3 obtained by the polarizing device 5 has a circular (specifically, annular) cross section rather than a polygonal cross section. Further, since the polarizing device 5 is configured by forming the dielectric film 53 on the conical surface 511 of the axicon lens 50, the configuration of the polarizing device 5 can be made very simple and it can therefore be manufactured at a low cost as compared with the above-mentioned conventional polarizing device having such a configuration that a dielectric film is formed in the regions of a transparent plate divided at equal angles about the center of the transparent plate. The radial polarized light beam LB3 having an annular cross section obtained by the polarizing device 5 is diverged to enter the axicon lens 6.

The axicon lens 6 converts the divergent radial polarized light beam LB3 into a parallel (cylindrical) radial polarized light beam LB4. The half-wave plate 7 is rotatable between a first position where the radial polarized light beam LB4 obtained by the axicon lens 6 is passed without being changed and a second position where the radial polarized light beam LB4 is converted into an azimuthal polarized light beam, wherein the second position is 90° C. shifted from the first position. Thus, the radial polarized light beam LB4 or the azimuthal polarized light beam obtained by the half-wave plate 7 is applied toward the focusing apparatus or condenser 10.

The focusing apparatus 10 is composed of a direction converting mirror 101 for converting the propagation direction of the radial polarized light beam LB4 or the azimuthal polarized light beam obtained by the half-wave plate 7 into a downward direction as viewed in FIG. 1 and a focusing lens 102 for focusing the radial polarized light beam LB4 or the azimuthal polarized light beam converted in direction by the direction converting mirror 101. The radial polarized light beam LB4 or the azimuthal polarized light beam focused by the focusing lens 102 of the focusing apparatus 10 is applied to the workpiece W held on the chuck table 20. The radial polarized light beam LB4 or the azimuthal polarized light beam focused by the focusing apparatus 10 forms an annular beam spot S1 on the upper surface of the workpiece W as shown in FIG. 1.

Figure 2:
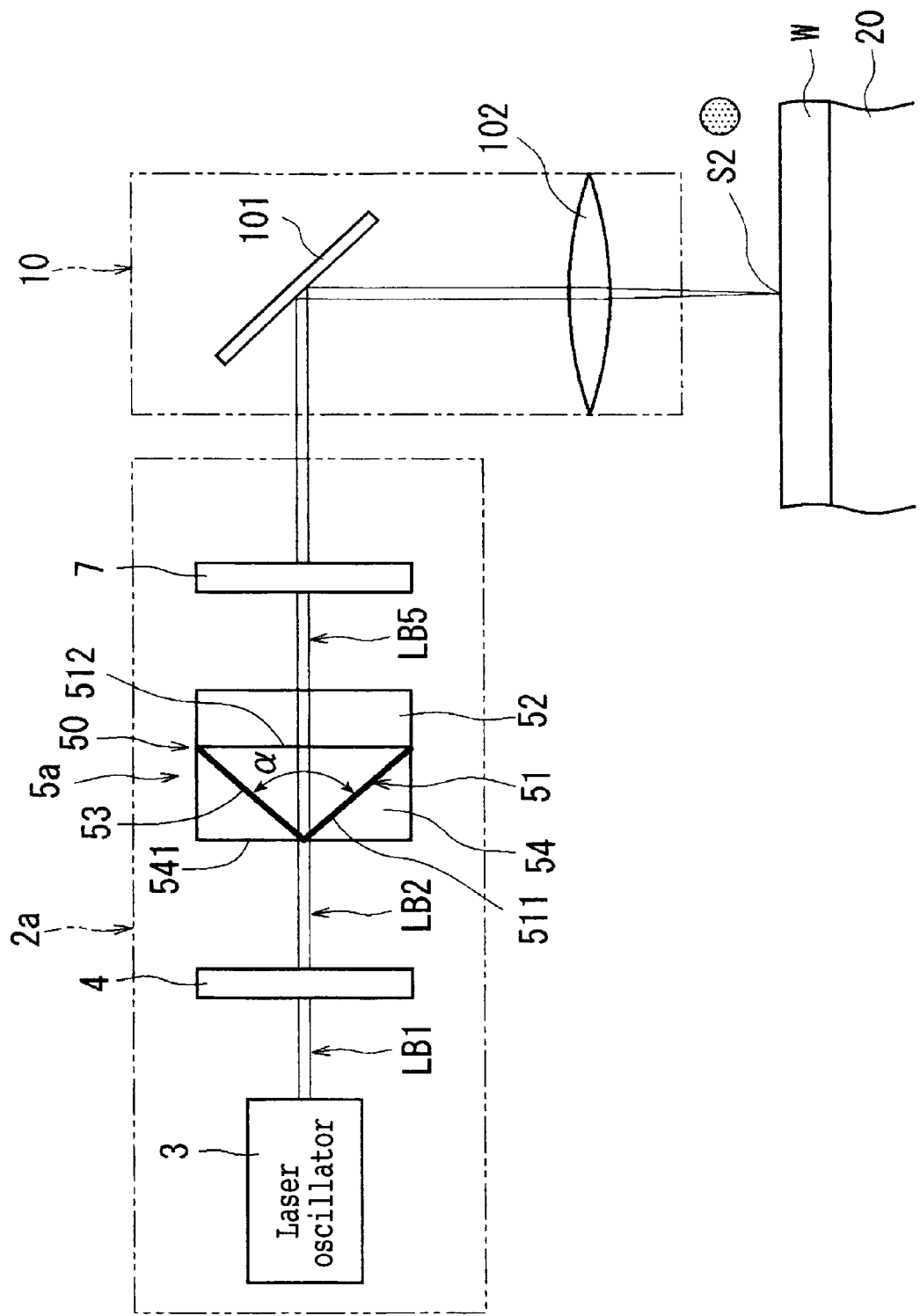
FIG. 2 is a schematic diagram showing the configuration of a laser processing apparatus including a laser unit using a polarizing device according to a second preferred embodiment of the present invention.

FIG. 2 shows a laser processing apparatus including a laser unit 2a using a polarizing device 5a according to a second preferred embodiment of the present invention. Like the laser processing apparatus shown in FIG. 1, the laser processing apparatus shown in FIG. 2 is composed of the laser unit 2a and a focusing apparatus 10 for focusing a laser beam applied from the laser unit 2a onto a workpiece W held on a chuck table 20. The focusing apparatus 10 and the chuck table 20 in the laser processing apparatus shown in FIG. 2 may be substantially the same in configuration as those in the laser processing apparatus shown in FIG. 1. Accordingly, the same parts are denoted by the same reference numerals, and the description thereof will be omitted herein.

The laser unit 2a shown in FIG. 2 includes a laser oscillator 3, a quarter-wave plate 4, the polarizing device 5a according to this preferred embodiment, and a half-wave plate 7 arranged in series in this order in the propagation direction of light. Like the laser oscillator 3 shown in FIG. 1, the laser oscillator 3 shown in FIG. 2 oscillates a linearly polarized light beam LB1. Like the quarter-wave plate 4 shown in FIG. 1, the quarter-wave plate 4 shown in FIG. 2 converts the linearly polarized light beam LB1 oscillated from the laser oscillator 3 into a circularly polarized light beam LB2.

Like the polarizing device 5 shown in FIG. 1, the polarizing device 5a converts the circularly polarized light beam LB2 obtained by the quarter-wave plate 4 into a radial polarized light beam LB5. The polarizing device 5a includes an axicon lens 50 and a transparent member 54 having the same refractive index as that of the axicon lens 50. The axicon lens 50 is composed of a conical portion 51 and a cylindrical portion 52. The conical portion 51 has a conical surface 511 and a bottom surface 512. A dielectric film 53 is formed on the conical surface 511. The conical surface 511 is covered with the transparent member 54. The transparent member 54 is bonded to the conical surface 511 of the conical portion 51 of the axicon lens 50 by an optical adhesive. The transparent member 54 has an incident surface 541 on which the vertex of the conical surface 511 lies, and the incident surface 541 of the transparent member 54 is parallel to the bottom surface 512 of the conical portion 51 of the axicon lens 50. The conical surface 511 has a vertex angle (α) of 90 degrees. The polarizing device 5a is set so that the center of the circularly polarized light beam LB2 obtained by the quarter-wave plate 4 coincides with the vertex of the conical surface 511.

The S-polarized light component of the circularly polarized light beam LB2 applied to the dielectric film 53 formed on the conical surface 511 of the polarizing device 5a is reflected by the dielectric film 53, and the P-polarized light component of the circularly polarized light beam LB2 is transmitted through the dielectric film 53 and converted into the radial polarized light beam LB5. The circularly polarized light beam LB2 incident on the polarizing device 5a is passed through the transparent member 54 having the same refractive index as that of the axicon lens 50 and next applied to the dielectric film 53 formed on the conical surface 511 of the axicon lens 50. Accordingly, the P-polarized light component of the circularly polarized light beam LB2 incident on the dielectric film 53 is not refracted to be converted into the radial polarized light beam LB5. Accordingly, the radial polarized light beam LB5 obtained by the polarizing device 5a has a circular cross section.

The radial polarized light beam LB5 having a circular cross section obtained by the polarizing device 5a is incident on the half-wave plate 7. The half-wave plate 7 is rotatable between a first position where the radial polarized light beam LB5 is passed without being changed and a second position where the radial polarized light beam LB5 is converted into an azimuthal polarized light beam, wherein the second position is 90° C. shifted from the first position. The radial polarized light beam LB5 or the azimuthal polarized light beam obtained by the half-wave plate 7 is applied toward the focusing apparatus 10. The focusing apparatus 10 is composed of a direction converting mirror 101 for converting the propagation direction of the radial polarized light beam LB5 or the azimuthal polarized light beam obtained by the half-wave plate 7 into a downward direction as viewed in FIG. 2 and a focusing lens 102 for focusing the radial polarized light beam LB5 or the azimuthal polarized light beam converted in direction by the direction converting mirror 101 onto the workpiece W held on the chuck table 20. The radial polarized light beam LB5 or the azimuthal polarized light beam focused by the focusing apparatus 10 forms a circular beam spot S2 on the upper surface of the workpiece W as shown in FIG. 2.

Figure 3:
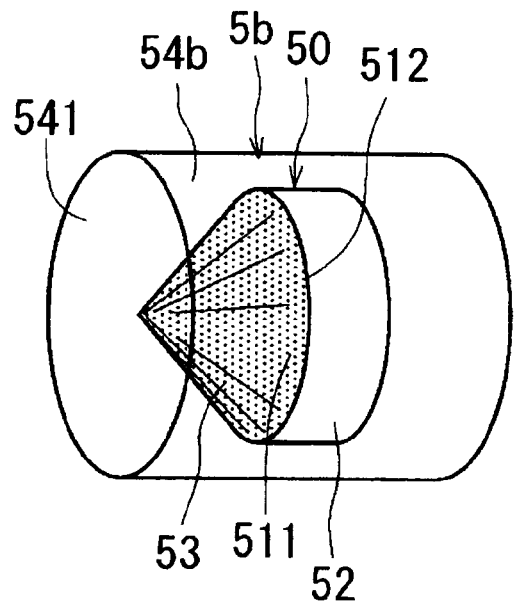
FIG. 3 is a perspective view of a polarizing device according to a third preferred embodiment of the present invention.

Referring next to FIG. 3, there is shown a polarizing device 5b according to a third preferred embodiment of the present invention. The polarizing device 5b shown in FIG. 3 is a modification of the polarizing device 5a shown in FIG. 2. Like the polarizing device 5a shown in FIG. 2, the polarizing device 5b shown in FIG. 3 includes an axicon lens 50 and a transparent member 54b having the same refractive index as that of the axicon lens 50. The axicon lens 50 has a conical portion 51 and a cylindrical portion 52. The conical portion 51 has a conical surface 511 and a bottom surface 512. A dielectric film 53 is formed on the conical surface 511. The whole of the axicon lens 50 is covered with the transparent member 54b. Like the transparent member 54 of the polarizing device 5a shown in FIG. 2, the transparent member 54b has an incident surface 541 on which the vertex of the conical surface 511 lies, and the incident surface 541 of the transparent member 54b is parallel to the bottom surface 512 of the conical portion 51 of the axicon lens 50. Like the polarizing device 5a shown in FIG. 2, the polarizing device 5b can convert the P-polarized light component of a circularly polarized light beam LB2 applied to the incident surface 541 of the transparent member 54b into a radial polarized light beam LB5 having a circular cross section.

Figure 4:
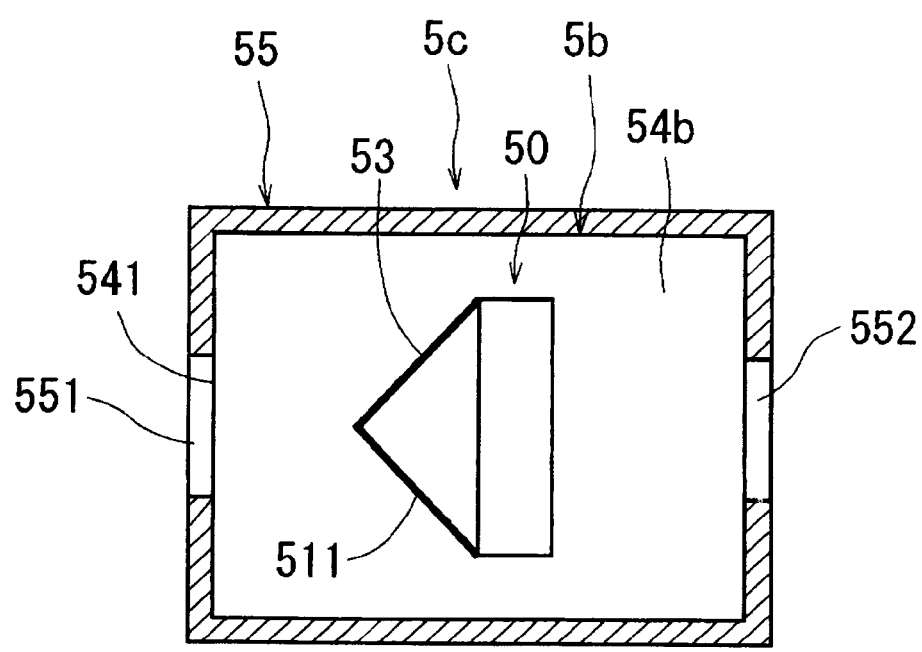
FIG. 4 is a sectional view of a polarizing device according to a fourth preferred embodiment of the present invention.

Referring next to FIG. 4, there is shown a polarizing device 5c according to a fourth preferred embodiment of the present invention. The polarizing device 5c shown in FIG. 4 is a modification of the polarizing device 5b shown in FIG. 3. The polarizing device 5c shown in FIG. 4 is configured by enclosing the polarizing device 5b in a case 55. The case 55 is formed with a beam entrance window 551 and a beam exit window 552 opposed to the beam entrance window 551. The polarizing device 5c is enclosed in the case 55 in such a manner that the dielectric film 53 is opposed to the beam entrance window 551. Like the polarizing device 5b shown in FIG. 3, the polarizing device 5c can convert the P-polarized light component of a circularly polarized light beam LB2 applied through the beam entrance window 551 to the incident surface 541 of the transparent member 54b into a radial polarized light beam having a circular cross section.

Figure 5:
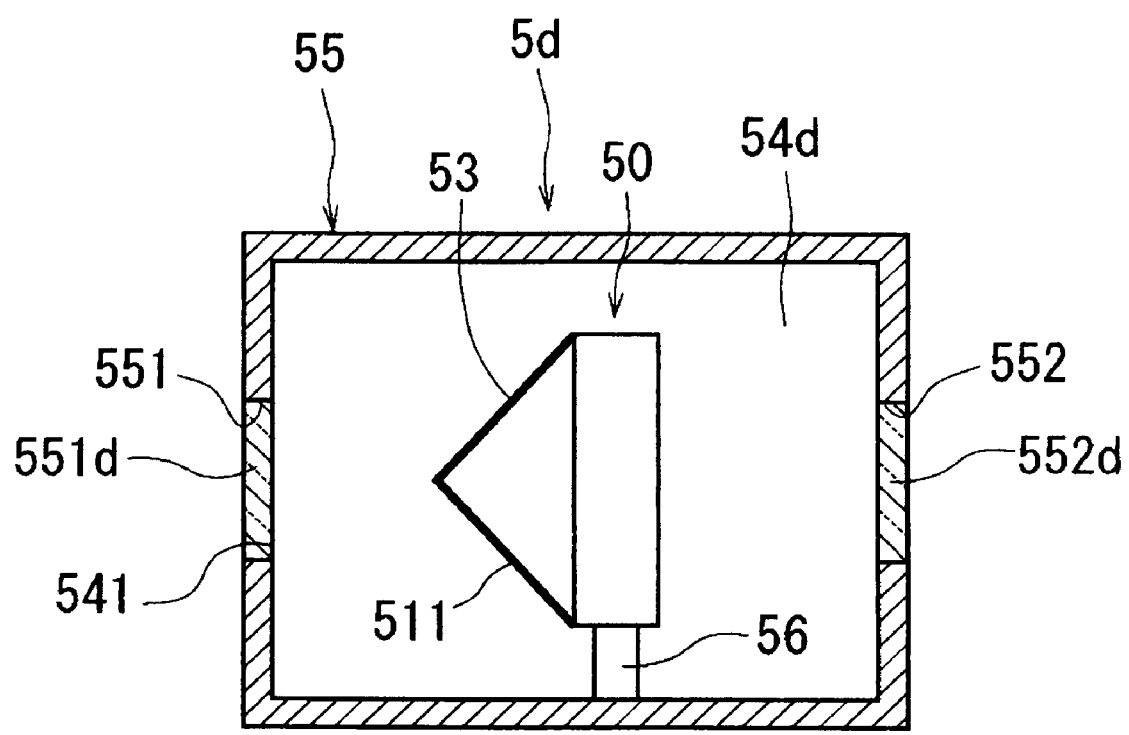
FIG. 5 is a sectional view of a polarizing device according to a fifth preferred embodiment of the present invention.

Referring next to FIG. 5, there is shown a polarizing device 5d according to a fifth preferred embodiment of the present invention. The polarizing device 5d uses a case 55 having a beam entrance window 551 and a beam exit window 552 as similar to the polarizing device 5c shown in FIG. 4. In the fifth preferred embodiment, however, the beam entrance window 551 is closed by a glass member 551d, and the beam exit window 552 is closed by a glass member 552d. Further, the polarizing device 5d uses a liquid transparent member 54d sealed in the case 55. An axicon lens 50 is set in the case 55 so as to be supported by a supporting member 56. A dielectric film 53 is formed on the conical surface 511 of the axicon lens 50. The liquid transparent member 54d has the same refractive index as that of the axicon lens 50. Like the polarizing device 5c shown in FIG. 4, the polarizing device 5d can convert the P-polarized light component of a circularly polarized light beam LB2 applied through the glass member 551d to the incident surface 541 of the liquid transparent member 54d into a radial polarized light beam having a circular cross section.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A polarizing device comprising:
an axicon lens having a conical surface and a bottom surface;
a dielectric film formed on said conical surface of said axicon lens; and
a transparent member provided so as to cover at least said conical surface of said axicon lens, said transparent member having the same refractive index as that of said axicon lens;
said transparent member having an incident surface parallel to said bottom surface of said axicon lens and being in direct contact with said dielectric film formed on said conical surface of said axicon lens,
wherein a circularly polarized light beam incident on said incident surface of said transparent member is converted into a radial polarized light beam by transmitting through said dielectric film; and
wherein said transparent member surrounds said axicon lens, such that the entire axicon lens, including the bottom surface, is covered by said transparent member.

2. The polarizing device according to claim 1, wherein said axicon lens is enclosed in a case that includes a beam entrance window on one side thereof and a beam exit window on an opposite side thereof.

3. The polarizing device according to claim 2, wherein said beam entrance window and said beam exit window are each formed by an aperture in said case.

4. The polarizing device according to claim 2, wherein said beam entrance window and said beam exit window are each formed by a glass member.

5. A laser unit comprising:
a laser oscillator;
a quarter-wave plate for converting a linearly polarized light beam oscillated from said laser oscillator into a circularly polarized light beam; and
a polarizing device for converting said circularly polarized light beam obtained by said quarter-wave plate into a radial polarized light beam;
said polarizing device including an axicon lens having a conical surface, a dielectric film formed on said conical surface of said axicon lens and a transparent member provided so as to cover at least said conical surface of said axicon lens, said transparent member having the same refractive index as that of said axicon lens;
said transparent member having an incident surface parallel to said bottom surface of said axicon lens and being in direct contact with said dielectric film formed on said conical surface of said axicon lens,
wherein said transparent member surrounds said axicon lens, such that the entire axicon lens, including the bottom surface, is covered by said transparent member.

6. The laser unit according to claim 5, wherein said axicon lens is enclosed in a case that includes a beam entrance window on one side thereof and a beam exit window on an opposite side thereof.

* * * * *